(12) United States Patent
Wess et al.

(10) Patent No.: US 6,321,040 B1
(45) Date of Patent: Nov. 20, 2001

(54) SYSTEM AND METHOD OF SCANNING, VIEWING AND WRITING INFORMATION ON A MAGNETIC LAYER OF PHOTOSENSITIVE FILM

(75) Inventors: Raymond E. Wess, Holley; Robert P. Cloutier, Spencerport; John R. Fredlund, Rochester, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/090,753

(22) Filed: Jun. 4, 1998

(51) Int. Cl.[7] .................................................. G03B 17/24

(52) U.S. Cl. ........................... 396/311; 396/319; 348/64; 348/96

(58) Field of Search ...................... 396/310, 311, 396/319; 348/64, 96

(56) References Cited

U.S. PATENT DOCUMENTS

| | | | |
|---|---|---|---|
| 4,862,200 | 8/1989 | Hicks ................................... 396/311 |
| 4,965,627 | 10/1990 | Robison ................................ 355/40 |
| 4,972,213 | 11/1990 | Stoneham et al. ................... 396/210 |
| 4,974,096 | 11/1990 | Wash .................................. 358/302 |
| 4,977,419 | 12/1990 | Wash et al. ........................... 396/311 |
| 4,987,439 | 1/1991 | Cloutier ............................... 355/40 |
| 5,005,031 | 4/1991 | Kelbe .................................. 396/320 |
| 5,006,873 | 4/1991 | Wash .................................. 396/311 |
| 5,016,030 | 5/1991 | Dwyer et al. ........................ 396/210 |
| 5,021,820 | 6/1991 | Robison ............................... 355/40 |
| 5,023,635 | 6/1991 | Nealon ................................ 396/311 |
| 5,122,821 | * 6/1992 | Nealon ................................ 396/319 |
| 5,130,745 | 7/1992 | Cloutier et al. ....................... 355/40 |
| 5,132,715 | 7/1992 | Taillie ................................. 396/319 |
| 5,136,317 | 8/1992 | Goto et al. ........................... 396/210 |
| 5,140,353 | 8/1992 | Stoneham ............................ 396/60 |
| 5,142,310 | 8/1992 | Taniguchi et al. ..................... 396/60 |
| 5,160,952 | 11/1992 | Iwashita et al. ...................... 396/281 |
| 5,184,174 | 2/1993 | Bell ..................................... 396/210 |
| 5,187,518 | 2/1993 | Kitagawa ............................. 355/40 |
| 5,194,892 | 3/1993 | Robison .............................. 355/40 |
| 5,227,823 | 7/1993 | Shigaki ............................... 396/311 |
| 5,276,472 | 1/1994 | Bell et al. ............................ 396/312 |
| 5,281,987 | 1/1994 | Nagata ................................ 396/210 |
| 5,289,227 | 2/1994 | Kinjo .................................. 396/78 |
| 5,294,949 | 3/1994 | Robison et al. ..................... 396/311 |
| 5,300,974 | 4/1994 | Stephenson, III .................... 396/311 |
| 5,307,100 | 4/1994 | Kubo ................................... 396/319 |
| 5,319,401 | 6/1994 | Hicks ................................. 355/40 |
| 5,335,029 | 8/1994 | Itoh et al. ............................ 396/311 |
| 5,344,730 | 9/1994 | Kitamoto ............................ 430/14 |
| 5,430,512 | 7/1995 | Itoh et al. ............................ 396/319 |
| 5,438,461 | 8/1995 | Egawa ................................ 360/51 |
| 5,448,372 | * 9/1995 | Axman et al. ....................... 348/96 |
| 5,459,540 | 10/1995 | Wakabayashi ...................... 396/210 |
| 5,461,439 | 10/1995 | Minakuti et al. .................... 396/311 |
| 5,461,440 | 10/1995 | Toyoda et al. ...................... 396/311 |
| 5,477,290 | 12/1995 | Takeshita ............................ 396/319 |

(List continued on next page.)

* cited by examiner

Primary Examiner—David M. Gray
(74) Attorney, Agent, or Firm—Frank Pincelli (57) ABSTRACT

A method and system of placing information on a photosensitive film having a magnetic layer provides for the storage of image data on the magnetic layer of the film in a manner which permits the image data to be easily recalled and displayed on a monitor. The system and method can utilize an enabled Advance Photo System camera which is capable of reading digital data magnetically encoded on film. The information can be compressed and written onto the film at the time of film processing. The enabled Advanced Photo System camera reads this information and is connectable to a host computer for permitting the transfer of the information from the camera to the computer. At the computer, the digital image data can be decompressed and viewed by a user for downstream manipulation of the images.

8 Claims, 5 Drawing Sheets

U.S. PATENT DOCUMENTS

| | | | |
|---|---|---|---|
| 5,502,527 | 3/1996 | Kazami et al. | 396/319 |
| 5,508,768 | 4/1996 | Wakabayashi et al. | 396/319 |
| 5,517,266 | 5/1996 | Funaki et al. | 396/319 |
| 5,519,462 | 5/1996 | Spencer et al. | 396/319 |
| 5,519,464 | 5/1996 | Brock et al. | 396/319 |
| 5,537,172 | 7/1996 | Amano | 396/60 |
| 5,546,145 | 8/1996 | Bernardi et al. | 396/312 |
| 5,555,043 | 9/1996 | Brock et al. | 396/320 |
| 5,555,044 | 9/1996 | Gandola et al. | 396/319 |
| 5,555,252 | 9/1996 | Brock et al. | 396/320 |
| 5,559,568 | 9/1996 | Kazami et al. | 396/320 |
| 5,572,268 | 11/1996 | Tamamura | 396/319 |
| 5,572,269 | 11/1996 | Brock et al. | 396/320 |
| 5,583,591 | 12/1996 | Saito et al. | 396/429 |
| 5,587,752 | 12/1996 | Petruchik | 396/315 |
| 5,600,385 | 2/1997 | Takeshita | 396/319 |
| 5,604,553 | 2/1997 | Ogawa | 396/310 |
| 5,608,490 | 3/1997 | Ogawa | 396/300 |
| 5,625,429 | 4/1997 | Kazami et al. | 396/300 |
| 5,634,158 | 5/1997 | Shon et al. | 396/320 |
| 5,640,201 | 6/1997 | Inuiya | 348/98 |
| 5,649,247 | 7/1997 | Itoh et al. | 396/311 |
| 5,655,164 | 8/1997 | Tsai | 396/312 |
| 5,678,102 | 10/1997 | Chamberlain, IV | 396/429 |
| 5,687,412 * | 11/1997 | McIntyre | 396/319 |
| 5,692,225 | 11/1997 | Bernardi et al. | 396/318 |
| 5,697,001 | 12/1997 | Ring et al. | 396/121 |
| 5,697,004 | 12/1997 | Saegusa et al. | 396/211 |
| 5,701,530 | 12/1997 | Fujino | 396/311 |
| 5,703,673 | 12/1997 | Tokuda | 355/40 |
| 5,710,618 * | 1/1998 | McIntyre | 396/319 |
| 5,799,219 * | 8/1998 | Moghadam et al. | 396/319 |
| 5,841,885 * | 11/1998 | Neff et al. | 348/64 |
| 5,974,182 * | 10/1999 | Bryniarski et al. | 382/232 |

* cited by examiner

SYSTEM AND METHOD OF SCANNING, VIEWING AND WRITING INFORMATION ON A MAGNETIC LAYER OF PHOTOSENSITIVE FILM

FIELD OF THE INVENTION

The present invention relates to the field of scanning, viewing and writing information on a magnetic layer of photosensitive film. The present invention further relates to a camera/player which is capable of reading digital image data that is magnetically encoded on photosensitive film at the time of film processing, as well as a system and method of providing photofinishing services.

BACKGROUND OF THE INVENTION

Digital cameras permit a user to obtain digital images that can be stored and manipulated on personal computers. The digital images can be loaded into the computer directly from a digital camera which has been connected to a computer. The images obtained from the digital camera can be used for on-line publishing, presentations and other applications related to digitally captured images.

Conventional photography does not permit a user to provide digital images to a computer without the aid of an additional device such as a film scanner, which is a dedicated device that tends to be expensive.

U.S. Pat. No. 5,640,201 discloses a film image input system which utilizes a film cartridge in which an image signal of each frame image is recorded on an EEPROM. However, this provides for an expensive and complicated system and cartridge structure since the image is stored on a chip which is provided on a cartridge.

U.S. Pat. No. 5,023,635 teaches a dual still video/film portrait system which utilizes a camera and a video imager. In this document, data pertaining to the film frame as well as a video frame number are recorded on a magnetic layer of the film and utilized for subsequent modifications. With the arrangement of U.S. Pat. No. 5,023,635, a complex camera and video imager arrangement is utilized in which two imaging paths with respect to a dual still video and a film portrait system are necessary.

SUMMARY OF THE INVENTION

The present invention provides for a system and method which enables a user to obtain digital image data from a conventional photographic system without needing an additional personal optical scanner, and at a reduced cost to the user. As is known, Advanced Photo System film such as IX film contains a magnetic coating on which digital information can be stored. Typically, the digital information that is stored on the magnetic coating includes a print aspect ratio, cartridge hand of load, artificial illuminant flag, date, time, aperture setting, and other data related to the images captured on the film, including frame titles or roll titles. However, the data stored is not limited to this type of information. It is noted that image data can also be stored on the film in a digital format.

In a feature of the present invention, image data is stored on the film by using magnetic encoding that can be easily recalled and displayed on a monitor for purposes such as indexing, presentation, retouching and publishing. By way of a magnetic reader in an enabled camera such as an enabled KODAK ADVANTIX Camera, this can be accomplished without the aid of additional equipment other than the original camera which captured the images.

The present invention relates to a method of placing information on photosensitive film, such as Advanced Photo System film, having a magnetic layer. The method comprises the steps of processing the photosensitive film; scanning the processed photosensitive film so as to obtain a digital record of captured images on the photosensitive film; converting the digital record to a digital informational format of the captured images on the photosensitive film for writing on the magnetic layer of the processed photosensitive film; and writing the digital informational format of the captured images on the magnetic layer of the processed photosensitive film.

The present invention further relates to a method of providing photofinishing services which comprises the steps of scanning a processed photosensitive film so as to obtain a digital record of captured images on the photosensitive film; compressing the digital record of the captured images; and writing the compressed digital record of the captured images on a magnetic layer of the photosensitive film.

The present invention also relates to a method of manipulating digital information on photosensitive film which comprises the steps of inserting a photosensitive film having a compressed digital record of captured images thereon into an enabled camera/player; connecting the enabled camera/player having the photosensitive film inserted therein to a computer; reading the compressed digital record on the photosensitive film; transferring the compressed digital record of the captured images to the computer; and decompressing the compressed digital record of the captured images.

The present invention further relates to a camera/player which comprises a receiving section adapted to receive a thrust film cartridge having a roll of processed photosensitive film therein, so as to permit a movement of the processed photosensitive film out of and back into the thrust film cartridge; and a magnetic read head for reading information on a magnetic layer of the processed photosensitive film as the processed photosensitive film is moved out of or into the thrust film cartridge.

The present invention also relates to a camera which comprises a receiving section for receiving a cartridge having a roll of photosensitive film therein; an exposure section for exposing the photosensitive film; a reading device for reading information on a magnetic layer of the photosensitive film; and a control device which is operable to place the camera in a first mode when the photosensitive film in the cartridge received at the receiving section is a processed roll of photosensitive film, and a second mode when the photosensitive film in the cartridge received at the receiving section is an unprocessed roll of photosensitive film, such that in said first mode said reading device reads information on a magnetic layer of said processed photosensitive film, and in said second mode the control device checks for other conditions.

The present invention also relates to a photofinishing service arrangement that comprises a processing assembly for processing photosensitive film having captured images thereon; a scanning assembly for scanning the processed photosensitive film to obtain a digital record of the captured images on the photosensitive film; a compressing assembly for compressing the digital record of the captured images; and a writing assembly for writing the digitally compressed record of the captured images on a magnetic layer of the processed photosensitive film.

The present invention also relates to a photosensitive film having a magnetic layer for receiving information which comprises a predetermined length L1, and a length L for capturing images which is less than the predetermined length L1. The predetermined length L1 permits a writing of digital information on the magnetic layer of the film past the length L.

The present invention also relates to a camera which comprises a receiving section for receiving a cartridge having a roll of photosensitive film therein; an exposure section for exposing the photosensitive film; a reading device for reading information on a magnetic layer of the photosensitive film; and a control device which is operable to place the camera in a reading mode when the photosensitive film in the cartridge received at said receiving section is a processed roll of photosensitive film, such that in the reading mode the reading device reads information on a magnetic layer of said processed photosensitive film.

DETAILED DESCRIPTION OF THE INVENTION

Figure 1:
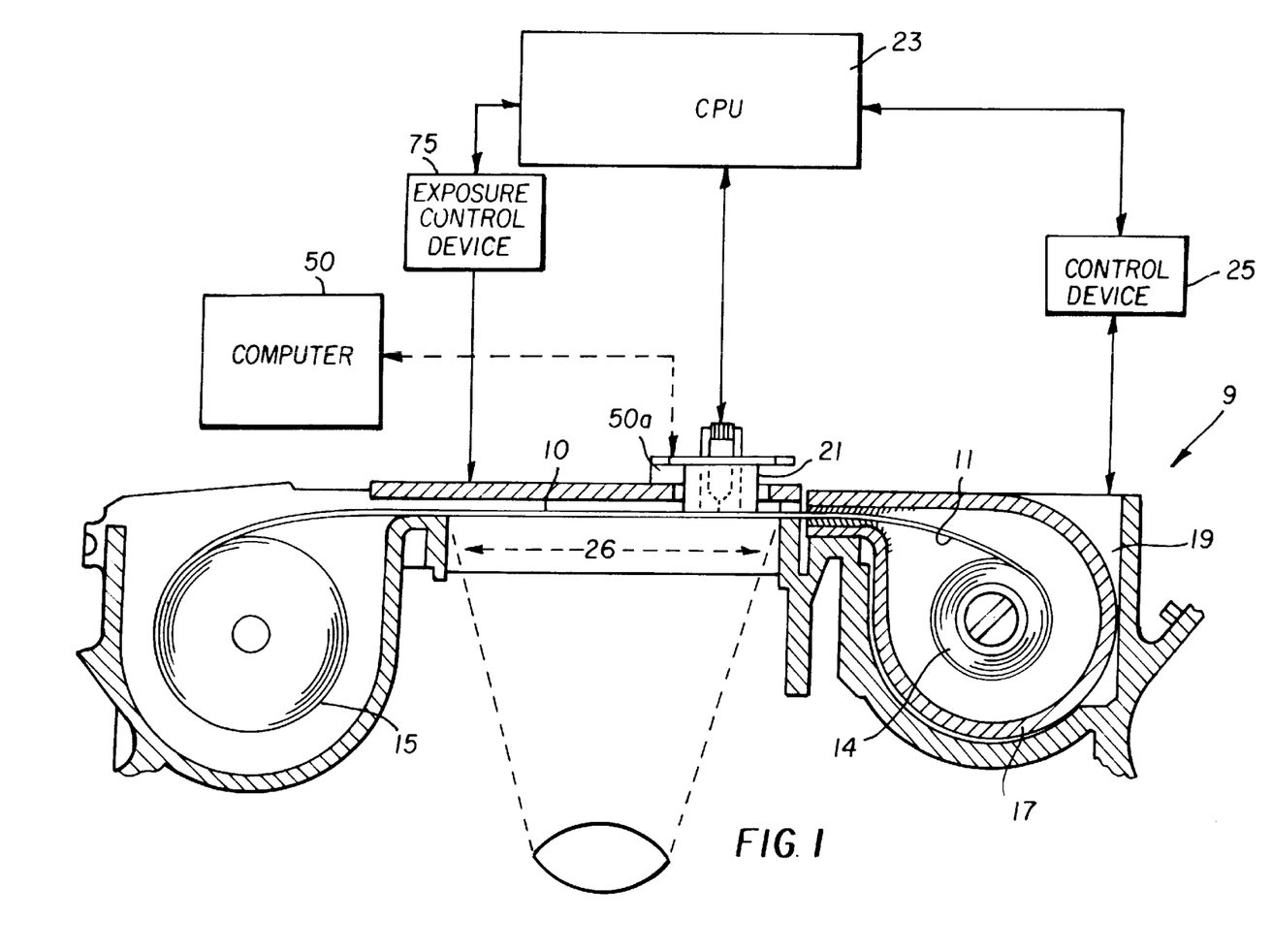
FIG. 1 schematically illustrates an enabled camera in accordance with the present invention which is adapted to read and write data on photosensitive film.

Referring now to the drawings, wherein like reference numerals designate identical or corresponding parts throughout the several views thereof, FIG. 1 schematically illustrates an enabled camera 9 and a control mechanism for camera 9. Camera 9 can be a KODAK ADVANTIX camera to be used with Advanced Photo System film such as illustrated in, for example, U.S. Pat. No. 5,229,810 and U.S. Pat. No. 4,965,627, the subject matter of which is herein incorporated by reference.

As illustrated in FIG. 1, camera 9 is adapted to transport a photosensitive film 11 between reels 14 and 15. As further shown in FIG. 1, during use, a cartridge 17 containing photosensitive film 11 is mounted in a receiving section 19 of camera 9.

Camera 9 includes a magnetic read/write head 21 which faces a magnetic layer 10 on an unsensitized side of photosensitive film 11. Camera 9 also includes a central processing unit (CPU) or microprocessor 23 which controls magnetic data recording or playback by magnetic read/write head 21 by way of electronics incorporated into central processing unit 23. As in known ADVANTIX cameras, central processing unit 23 can accept order information to be magnetically recorded on photosensitive film 11 from a camera user, or can accept scene related information to be magnetically recorded on photosensitive film 11. In a feature of the present invention which will be described later, central processing unit 23 can also receive instructions or signals from a control device 25 for reading digital image information on magnetic layer 10 of an exposed or processed roll of photosensitive film, which is representative of images captured on the photosensitive film.

During use of camera 9 as illustrated in FIG. 1, a user captures images on photosensitive film 11 and exposes the images at an exposure section 26 by use of an exposure control device 75 in a known manner. With the system and method of the present invention, at the time of image capture, no image data is written to the magnetic layer of the film by conventional means. However, other information such as date and time may be written to the film if desired as described above. The film is thereafter sent to a traditional processing lab where the film is processed and can be optically printed.

Figure 2:
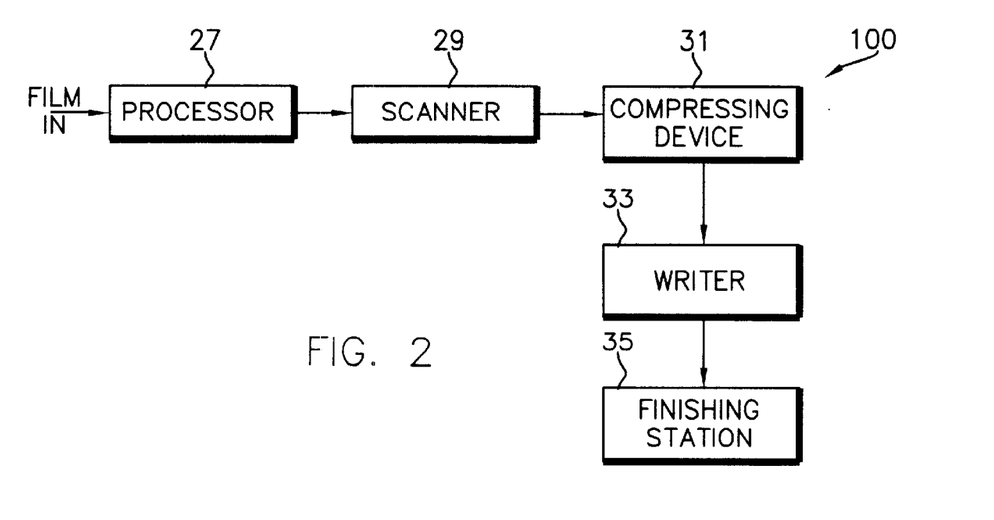
FIG. 2 schematically illustrates a photofinishing system of the present invention.

Referring to FIG. 2, a schematic illustration of a processing or photofinishing service or system 100 in accordance with the present invention is shown. As illustrated in FIG. 2, an exposed roll of photosensitive film is introduced into a processing assembly 27 which can be a known processing assembly that includes a series of stations or tanks that contain developing, bleaching, fixing, washing and drying solutions. In processing assembly 27, the photosensitive film is sequentially conveyed through the series of stations or tank, with each one containing a different processing solution appropriate to the process step at that station. After the photosensitive film is processed, the film can be digitally scanned by a scanning assembly 29 to obtain a digital record information or data of the images captured on the photosensitive film. At this point the digital record or data of the images can be used to make an index print corresponding to the optical images on the photosensitive film. Scanning assembly 29 can scan the photosensitive film and capture digital images with a typical resolution of 340 pixels by 298 pixels. For example, a Kodak CLAS digital film scanner can be used to provide digital images at this resolution.

As further shown in FIG. 2, after a digital record of the captured images is obtain by scanning assembly 29, the digital record of the captured images is digitally compressed by a known compressing mechanism 31. The compression takes place using known JPEG compression techniques. Additional measures to reduce frequency content can also be used to reduce the file size of the images. In addition, the length of the photosensitive film can be increased, as will be described later, so as to increase the magnetic storage capacity of the magnetic layer of the photosensitive film, so as to enable higher resolution image capacity. This type of system would not need to necessarily conform to a standard number of optical frames.

As also shown in FIG. 2, after the digital record of the images is compressed by compressing mechanism 31, the photosensitive film can be delivered to a writing mechanism 33 which can be an enhanced scanner/writer modified to write in the image area of photosensitive film. At writing mechanism 33, the compressed digital record of the images are written onto the magnetic layer of the photosensitive film. The compressed digital image record can be written on the photosensitive film in a continuous field that covers the entire length of the film. This simplifies and improves the reliability of the reading of the digital record which will be described later and occurs in the camera. It is noted that a continuous stream of the image record across the entire length of the photosensitive film frees the system from difficulties associated with one-to-one correspondence of images to the optical image frame when writing the images to the film. Once the images are compressed and written on magnetic layer 10 of photosensitive film 11, film 11 can be reinserted into a cassette at a finishing station 35 and returned to the customer.

Figure 3:
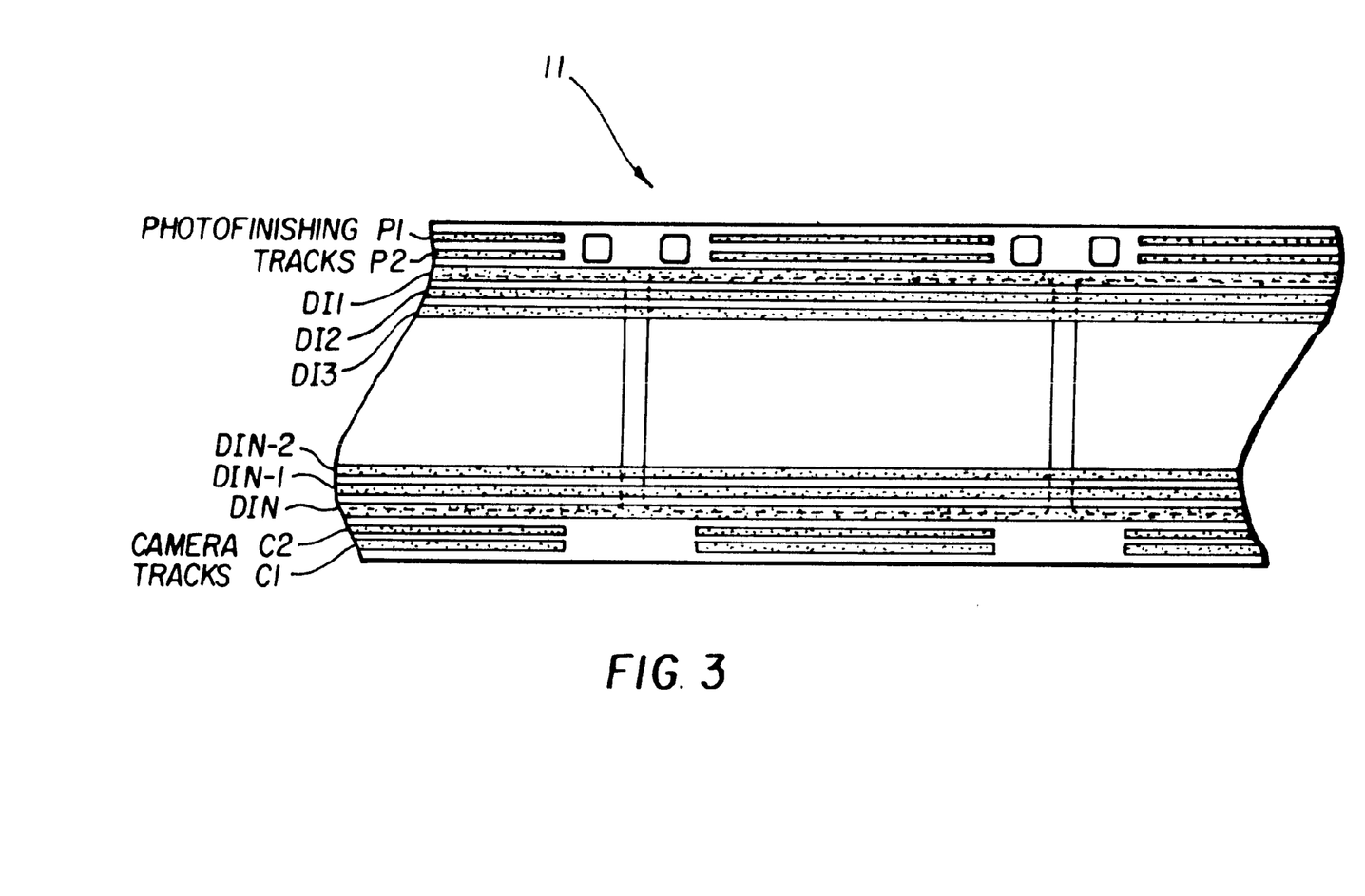
FIG. 3 is a diagram illustrating parallel dedicated tracks in a transparent magnetic layer of a photosensitive film which are adapted to be used with the system and method of the present invention.

FIG. 3 shows an example of photosensitive film 11, such as Advanced Photo System film, having magnetic tracks P1, P2; C1, C2; DI1–DIN which can be utilized in the present invention. FIG. 3 shows an arrangement of digital tracks DI1–DIN in an image area of photosensitive film 11. These digital image tracks DI1–DIN can be positioned between photofinishing tracks P1, P2 and camera tracks C1, C2 as illustrated in the FIG. 3. The number of tracks needed is dependent on the digital image compression ratio and the number of images written to the magnetic film tracks. By capturing, converting, compressing and writing the digital image record at the photofinisher, the amount of sophisticated electronic hardware needed to accomplish these operations is significantly reduced in the camera of the present invention. As shown in FIG. 3, the digital image record may be written along tracks DI1–DIN and depending on the size of the image and the amount of desired compressing, all the tracks or some of the tracks can be utilized. Also, the images can be written to and read from multiple tracks simultaneously or individually.

It is noted that digital images require a significant amount of magnetic recording area. A typical Advanced Photo System index image scanned on a Kodak CLAS digital film scanner requires at least 609 K bytes (600×338×3) of uncompressed magnetic recording space. JPEG compression can reduce the amount of memory space required on average to about 35 K bytes when a 15 to 1 compression ratio can be obtained. Additional techniques such as applying a low-pass filter to the digital image before JPEG compression can be implemented to reduce the size of the final image beyond a ratio of 15 to 1. Adjusting JPEG parameters such as the quantization factor can reduce the size of the image even more. Also, non-JPEG compression techniques may be used. It is reasonable to assume that an 80 to 1 compression ratio could be obtained by applying additional reduction techniques, however, there is still a disparity in storage versus needed recording space.

A technique in overcoming the disparity in storage versus needed recording space is to double the number of magnetic tracks and magnetic read heads. This is an expensive approach and difficult to implement. Another technique involves dithering the magnetic read head to extend the read capability of the magnetic read head. This method requires the ability to move the head and further requires additional passes over the film to read additional tracks.

Figure 4:
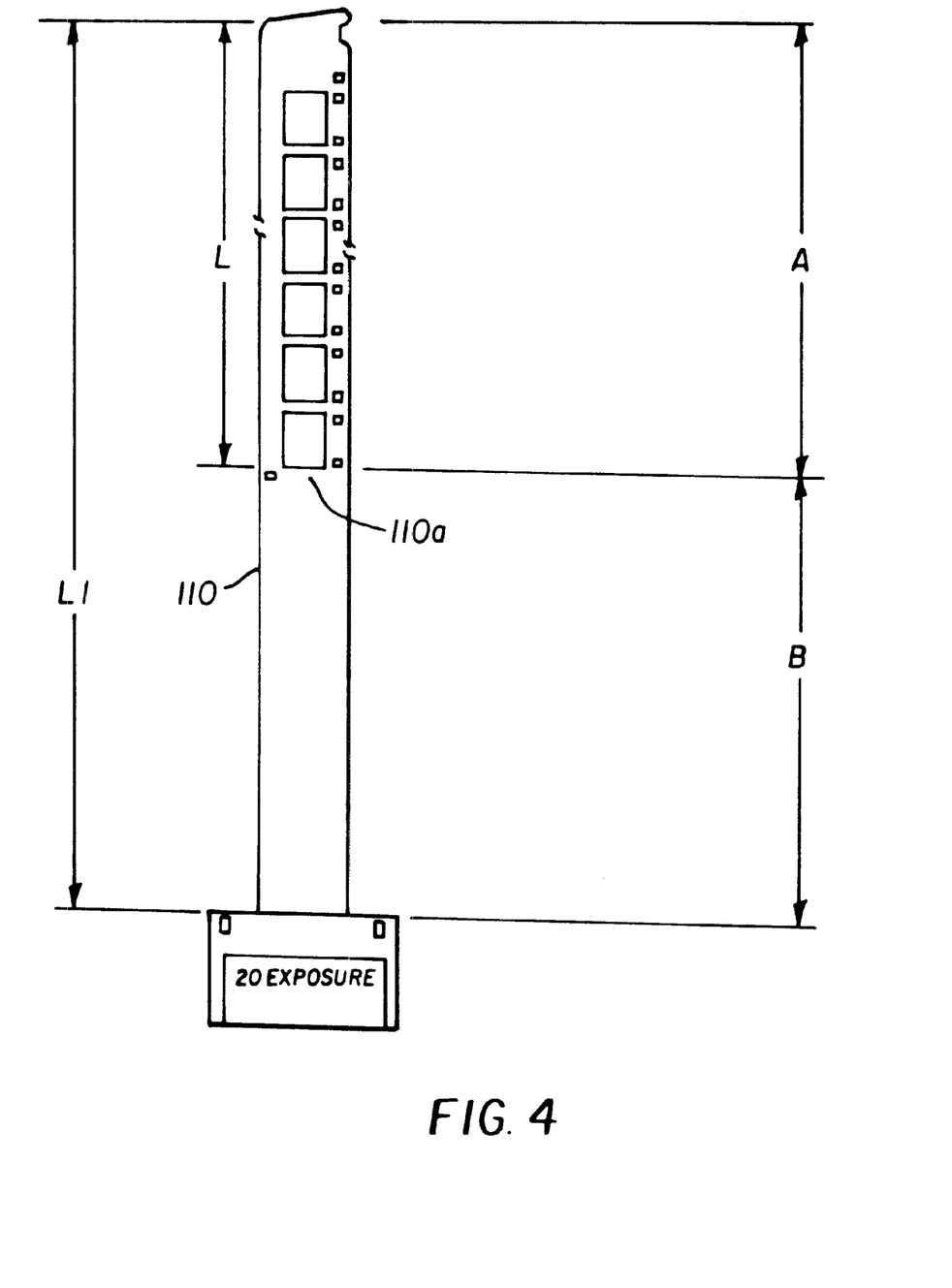
FIG. 4 illustrates a further feature of the photosensitive film adapted to be used with the system and method of the present invention.

The present invention provides for an approach to double or increase storage capacity by doubling or increasing the length of the photosensitive film while maintaining the same number of optical frames on the film. FIG. 4 shows a photosensitive film 110 in accordance with the present invention which includes an extended film length that extends beyond last film frame 110a. Thus, as shown in FIG. 4, photosensitive film 110 includes a length L equal to A for capturing images as well as a length L1 equal to A+B. The distance B as illustrated in FIG. 4 represents the additional length of photosensitive film 110 which provides extra storage capacity to permit the writing of increased magnetic information on photosensitive film 110. Depending on design considerations and the amount of extra storage capacity required, distance B could be less than distance A, but set at a value which provides for a photosensitive film length that is greater than existing photosensitive film lengths; distance B could be greater than distance A; or as shown in FIG. 4, distance B could be equal to distance A.

Therefore, the arrangement illustrated in FIG. 4 provides for photosensitive film with an extended film length that extends beyond the last film frame. Current standard Advance Photo System film cassettes contain about five inches of film beyond the last optical frame. Five inches is about equal to four optical images. In the present invention, as an example, a photosensitive film cassette containing 20 optical image frames with magnetic storage capacity for 20 compressed digital images would contain the same length of film as a 40 exposure photosensitive film cassette. This provides extra magnetic recording area to permit a continuous writing of digital image data.

Figure 5:
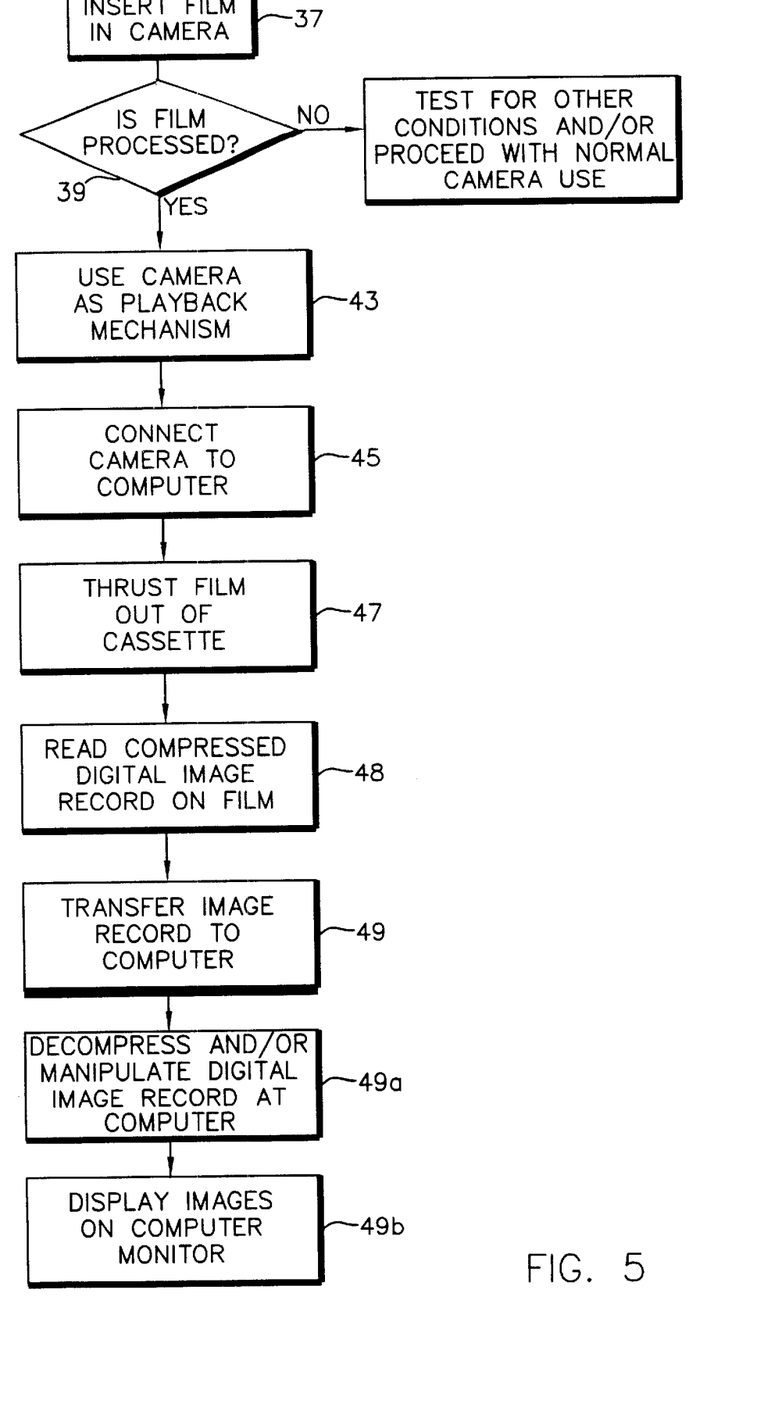
FIG. 5 is a schematic illustration of a feature of the system of the present invention.

Referring now to the flow chart of FIG. 5 as well as enabled camera 9 of FIG. 1, once the processed photosensitive film with the magnetic encoded compressed digital image record written thereon is returned to the user, with the system and method of the present invention, the images can be read into and displayed on a computer monitor. As shown in FIG. 5, the processed photosensitive film is first inserted back into camera 9 (step 37). That is, cassette 17 containing processed photosensitive film 11 having magnetic information encoded thereon, is inserted into receiving area 19 of camera 9. Once inserted in receiving area 19, control device 25 which can be a sensor connected to CPU 23 checks to see whether the photosensitive film in cassette 17 is processed (step 39). If the answer to step 39 is no, the film within the cassette 17 may be an unexposed roll of film and the camera can be utilized in a normal picture taking manner based on instructions or signals from CPU 23, or the camera can test and/or check for other conditions and act accordingly (first mode) (step 41). If the answer to step 39 is yes, camera 9 is to be utilized as a playback mechanism (step 43) (second mode). In the second or reading mode, camera 9 which includes a communication port 50a for connection to a computer 50 is connected to computer 50 (step 45). At this point, based on instructions or signals from CPU 23, processed photosensitive film within cassette 17 can be thrust out of cassette 17 (step 47), and control device 25 provides a signal to CPU 23 to activate magnetic read/write head 21 to read the compressed digital image record on the photosensitive film (step 48). As the digital image record is being read by magnetic read/write head 21, the digital image record is transferred to computer 50 (step 49) where the digital image record is decompressed and/or manipulated (step 49a), and thereafter displayed on a monitor of computer 50 (step 49b).

As a further option, control device 25 can be a switching mechanism which is movable between at least a picture-taking first mode and playback and/or reading second mode. When an unexposed roll of photosensitive film is placed in camera 9, control device 25 can be manually switched to a picture-taking mode which provides a signal to CPU 23 to operate camera 9 in a normal picture taking mode. When a processed roll of photosensitive film having digital information thereon is inserted in camera 9, control device 25 can be manually switched to a playback mode in which CPU 23 instructs the film to be thrust out of the cartridge and instructs magnetic read/write head 21 to read the information on the film. The camera would then thereafter operate in a playback mode as described above.

Thus, with the system and method of the present invention, the processed photosensitive film having a compressed digital record of captured images thereon can be placed back into an original camera in which the images were captured. The camera can then be connected to a computer by cable or other means of transmitting data. This could be by way of serial, parallel or USB ports that can be used depending on the computer's application and hardware capabilities. An application residing on a computer is initiated by the user which automatically downloads or transfers all the images stored on magnetic layer of the photosensitive film by the photofinisher at the time of processing. Once the images are transferred to computer 50, they are automatically decompressed and displayed on the computer monitor. In addition to downloading and decompression, the computer application has the ability to send commands to the camera for controlling film motion, and if desired, save images to another digital data recording medium.

Thus, in the present invention, the camera functions no differently than an Advanced Photo System camera such as a KODAK ADVANTIX camera during picture taking. It is after the exposed film has been processed that the camera functions in a different manner. The enabled camera of the present invention allows a cartridge having processed film to be inserted therein and the film to be thrust out. Conventional Advanced Photo System cameras do not allow processed film to be thrust out of the cartridge. Also, existing cameras do not allow exposures to be made on completely exposed or processed cartridges. Most cameras block insertion of exposed cartridges with a mechanical double exposure prevention (DEP) hook in the camera cartridge chamber. More sophisticated cameras allow the exposed or processed film to be inserted into the camera but read the position of the data disk to determine the status of the cartridge and prevent exposures from being applied. The enabled camera of the present invention includes a control device which can automatically determine whether the cassette inserted into the camera contains processed or unexposed film, or can be manually switched between a camera mode and a playback mode based on whether the film inserted therein is processed or unexposed.

As also described above, enabled camera 9 of the present invention will have a connection via a cable or other means to computer 50. Software running on computer 50 allows camera 9 to communicate with computer 50 and can control the fashion in which camera 9 reads data from the magnetic layer of the film.

Once communication between camera 9 and computer 50 is established, the camera thrusts the film out of the cassette and reads the data which is encoded on the film in multiple tracks. Alternatively, the film may be thrust out completely, and the reading operation can occur only when rewinding the film back into the cartridge. Also, the film could be read both on the way out and on the way into the cartridge. Preferred reading would most likely occur during the time when the film is thrust out of the cartridge since film jitter can be better controlled.

An advantage of the system and method of the present invention is that image data or information on the magnetic layer of the film can be read as a continuous stream of data with no correspondence to the optically captured images on the film. Since there is no correspondence to the film captured imagery, the data on the film may be read as continuous parallel tracks rather than individual segments corresponding to film images. Reading speed can be held more constant, thus maximizing data density. Additionally, less error correction and redundancy are necessary.

Enabled camera 9 through CPU 23, control device 25 and magnetic read/write head 21 reads the data from the magnetic layer of the film and formats it such that it can be sent to computer 50. It is advantageous for computer 50 to read the data from camera 9 as soon as it becomes available so that the buffer memory requirements of camera 9 are minimized or eliminated. Upon receiving all or a portion of the data from camera 9, the software running on computer 50 reconfigures and decompresses the data into images. In this fashion, the processing power of the camera is minimized. Camera 9 needs only to be able to read the data and communicate it. All image processing is completed in computer 50. Once the processing is complete, the images can be available for use as image files.

Figure 6:
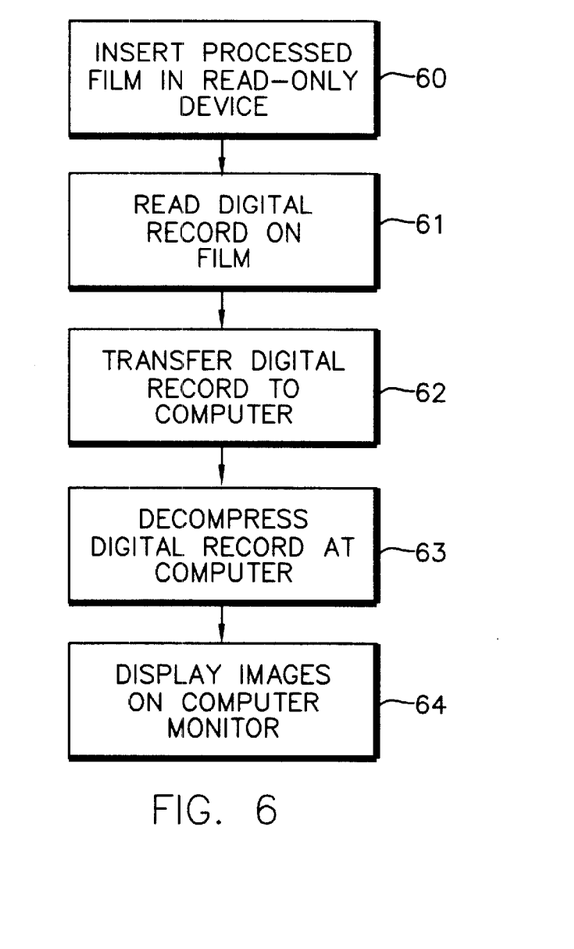
FIG. 6 is a schematic illustration of a modification of the system of the present invention.

As schematically illustrated in FIG. 6, in a further feature of the present invention, rather than utilizing a camera to read back the compressed digital record on the photosensitive film, a player may be provided for the consumer who only has a conventional Advanced Photo System camera. The player would work in the same way as the camera described above, except that the player would not take pictures. It would be a read-only device, such as a floppy drive reading picture disk, a CD-ROM drive etc., intended to read the data into the computer. Therefore, as shown in FIG. 6, the cassette having the processed film and compressed digital image record thereon would be inserted into a read only device which is connected to a computer (step 60). At this point, the read-only device would read the compressed digital image record on the film (step 61). As the read-only device reads the compressed digital image record on the photosensitive film, the digital image record is transferred to computer 50 (step 62). At computer 50, the compressed digital image record can be decompressed or manipulated (step 63), to permit a viewing of the images at the computer monitor (step 64).

The concept of the present invention is also applicable to retail order stations. In this application, a retail order station with the ability to read magnetic image data can provide a low cost solution to a retailer who desires to offer customized reprint services. The system would include a computer, magnetic reader, a monitor, and a simple user interface. The same magnetic reader that a retailer would use could also be used by a consumer to obtain digital images in their home.

Thus, the present invention provides for a system and method which can display and capture images on a computer through the use of an enabled Advanced Photo System camera without the necessity of additional hardware. The enabled Advanced Photo System camera can act as a simple playback mechanism or alternatively, a read-only device can be utilized. This provides for a lower cost to the consumer. The present invention also provides for image compression/decompression which is done at a photofinisher and on a computer, as opposed to the camera. This simplifies the requirements of the camera. Also, the digital image files are placed on the same medium as high resolution analog images. Further, the digital image files do not have to be associated with frames and can be provided on tracks that run continuously along the entire length of the film.

The invention has been described in detail with particular reference to certain preferred embodiments thereof, but it will be understood that variations and modifications can be effected within the spirit and scope of the invention.

What is claimed is:

1. A method of placing information on a photosensitive film having a magnetic layer, the method comprising the steps of:
    processing said photosensitive film having captured images;
    scanning said processed photosensitive film so as to obtain a digital record of said captured images on said photosensitive film;
    converting said digital record to a digital informational format of the captured images on said photosensitive film for writing on the magnetic layer of said processed photosensitive film; and writing said digital informational format of said captured images on said magnetic layer of said processed photosensitive film.

2. A method according to claim 1, wherein:

said step of converting said digital record to said digital informational format comprises the step of digitally compressing said digital record of said captured images; and said step of writing said digital informational format on said magnetic layer comprises the step of writing said digitally compressed digital record of said captured images on said magnetic layer of said processed photosensitive film.

3. A method according to claim 1, wherein said step of writing said digital informational format on said magnetic layer of said processed photosensitive film comprises the step of writing said digital informational format on said processed photosensitive film in a serial manner.

4. A method of providing photofinishing services, the method comprising the steps of:

scanning a processed photosensitive film so as to obtain a digital record of captured images on the photosensitive film;

compressing said digital record of the captured images; and writing said compressed digital record of said captured images on a magnetic layer of the photosensitive film.

5. A method according to claim 4, wherein said step of writing said compressed digital record of said captured images on the magnetic layer of the photosensitive film comprises the step of writing said compressed digital record on said film in a serial manner.

6. A method according to claim 4, wherein said photosensitive film is a roll of film having a predetermined length L1 and a length L on said photosensitive film for capturing images, said length L being less than said predetermined length L1, so as to permit the writing of said compressed digital record of said captured images past said length L.

7. A photofinishing service arrangement comprising:

a processing assembly for processing photosensitive film having captured images thereon;

a scanning assembly for scanning said photosensitive film to obtain a digital record of the captured images on said film;

a compression assembly for compressing said digital record of said captured images; and a writing assembly for writing said digitally compressed record of said captured images on a magnetic layer of said processed photosensitive film.

8. A photofinishing system according to claim 7, wherein said compressed digital record is written on said magnetic layer of said processed photosensitive film in a serial manner.

* * * * *